US012741836B2

(12) United States Patent
Yokobori

(10) Patent No.: US 12,741,836 B2
(45) Date of Patent: Sep. 22, 2026

(54) SHEET FEEDING DEVICE AND IMAGE FORMING APPARATUS

(71) Applicant: CANON KABUSHIKI KAISHA, Tokyo (JP)

(72) Inventor: Yuya Yokobori, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/089,487

(22) Filed: Mar. 25, 2025

(65) Prior Publication Data

US 2025/0326595 A1    Oct. 23, 2025

(30) Foreign Application Priority Data

Apr. 18, 2024 (JP) ................................. 2024-067736

(51) Int. Cl.
*B65H 3/48* (2006.01)
*B65H 1/18* (2006.01)
*B65H 3/12* (2006.01)
*G03G 15/00* (2006.01)

(52) U.S. Cl.
CPC ................. *B65H 3/48* (2013.01); *B65H 1/18* (2013.01); *B65H 3/128* (2013.01); *B65H 2515/34* (2013.01); *G03G 15/6511* (2013.01); *G03G 2215/00383* (2013.01); *G03G 2215/004* (2013.01)

(58) Field of Classification Search
CPC . B65H 3/48; B65H 1/18; B65H 3/128; B65H 2515/34; G03G 15/6511; G03G 2215/00383; G03G 2215/004
See application file for complete search history.

(56) References Cited

U.S. PATENT DOCUMENTS

| | | | | |
|---|---|---|---|---|
| 7,722,029 | B2 | 5/2010 | Gruntjes | |
| 8,480,074 | B2 | 7/2013 | Ubayashi | |
| 9,670,027 | B2 | 6/2017 | Yokobori | |
| 2004/0089994 | A1 * | 5/2004 | Koga | B65H 3/128 271/98 |
| 2006/0288893 | A1 * | 12/2006 | Ikeda | G03G 15/6511 101/407.1 |
| 2007/0052152 | A1 * | 3/2007 | Gruntjes | B65H 3/48 271/97 |
| 2022/0082977 | A1 * | 3/2022 | Maeda | G03G 15/6529 |

FOREIGN PATENT DOCUMENTS

JP 2007-070122 A 3/2007

* cited by examiner

*Primary Examiner* — Thomas A Morrison
(74) *Attorney, Agent, or Firm* — Venable LLP

(57) ABSTRACT

A sheet feeding device includes a sheet tray, a feeder to feed the uppermost sheet of a sheet bundle supported by a supporting surface of the sheet tray; a blowing portion provided on one side in a widthwise direction perpendicular to a feeding direction and to blow air through a blowing opening toward a side edge of the sheet bundle supported by the supporting surface; and a rotatable portion. The rotatable portion is rotatably provided opposite to the blowing opening in the widthwise direction and to the sheet tray, and is rotatable between a first position along the supporting surface and a second position rotated upward from the supporting surface by the air being blown by the blowing portion. When the rotatable portion is positioned in the second position, the rotatable portion includes a restricting portion to restrict the air from being blown to the supporting surface.

14 Claims, 9 Drawing Sheets

(a)

(b)

(a)

(b)

(a)

(b)

SHEET FEEDING DEVICE AND IMAGE FORMING APPARATUS

DESCRIPTION OF THE RELATED ART

The present invention relates to a sheet feeding device that feeds a sheet, and an image forming apparatus which uses this sheet feeding device.

Conventionally, in order to certainly feed a sheet from a sheet tray that lifts and lowers corresponding to a number of the sheets stacked on the sheet tray, a sheet feeding device which blows loosening air and separation air to the sheet in the sheet tray is well-known. In this sheet feeding device, loosening air is blown from a side end part of a sheet bundle stacked on the sheet tray, the sheet having been floated is sucked by a sucking belt, and then separation air is blown from a downstream side to an upstream side of a sheet feeding direction. Thus, when separation air is blown to the sheet sucked by the sucking belt, air comes between an uppermost sheet and a following sheet that sticks under the uppermost sheet to separate the uppermost sheet only from the sheet bundle certainly and then the uppermost sheet is fed by the sucking belt.

Also, according to Japanese Laid-Open Patent Application No. 2007-70122, in a position that faces a blowing opening in the sheet tray, a structure that includes a rotating board which is able to open and close by rotation and forms a space in between the sheet tray when it is in an opening position. This rotation board is in the closing position when a lot of sheets are stacked on the sheet tray, but the rotation board lifts and rotates to be into the opening position by loosening air blown when a number of sheets is low. However, in this sheet feeding device described in Japanese Laid-Open Patent Application No. 2007-70122 mentioned above, there is a risk that air might flow in between the lowest sheet placed on the sheet tray and the sheet tray itself when the loosening air is blown. In the case this happens, the whole bundle of the sheet sheets is lifted and pushed up to the sucking belt above when the number of the sheets is low. As a result of this, when the sucking belt begins sucking a sheet, there is a risk that the uppermost sheet is sucked up with a second sheet and later sticked underneath and is not able to be separated even when the separation air is blown.

SUMMARY OF THE INVENTION

The object of this invention is to provide the sheet feeding device and the image forming apparatus that can improve separation ability for the sheet bundle.

To solve the problem as described above, an aspect of the present invention provides as follows: a sheet feeding device comprising: a sheet tray including a sheet supporting surface configured to support a sheet bundle; a feeding portion configured to feed the uppermost sheet of the sheet bundle supported by the sheet supporting surface; a blowing portion provided on one side in a sheet widthwise direction perpendicular to a sheet feeding direction and configured to blow air through a blowing opening toward a side edge of the sheet bundle supported by the sheet supporting surface; and a rotatable portion rotatably provided in a position opposing the blowing opening in the sheet widthwise direction and to the sheet tray, the rotatable portion being rotatable between a first position along the sheet supporting surface and a second position rotated upward from the sheet supporting surface by the air being blown by the blowing portion, wherein when the rotatable portion is positioned in the second position, the rotatable portion includes a restricting portion configured to restrict the air from being blown to the sheet supporting surface.

Another aspect of the present invention provides an image forming apparatus that is provided with the sheet feeding device as described above and the image forming portion that forms an image on a sheet.

Further features of the present invention will become apparent from the following description of exemplary embodiments with reference to the attached drawings.

Figure 4:
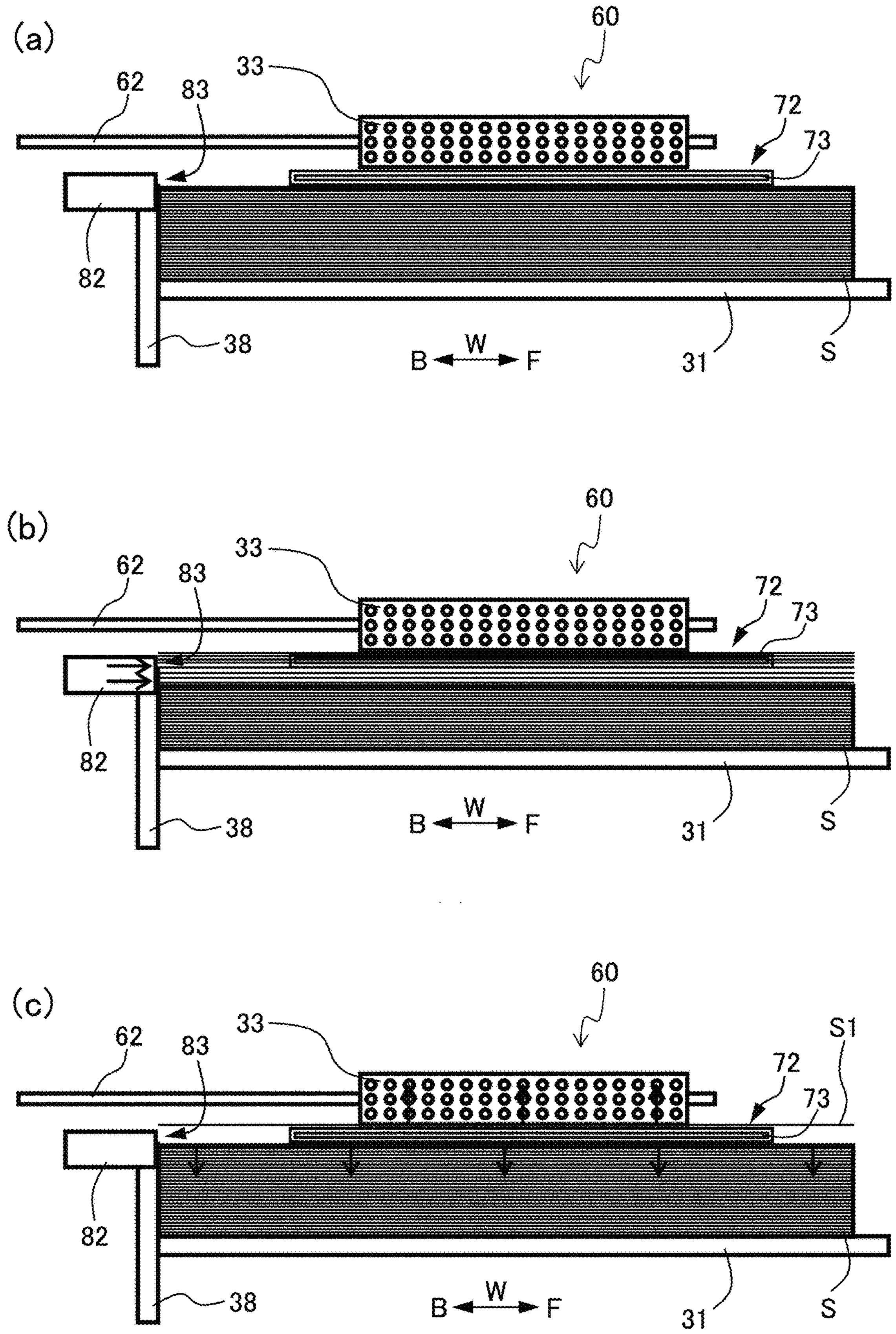

Part (a) of FIG. 4 is a left side view showing a state that a lot of sheets are supported in a sheet bundle before loosening air is blown in the embodiment.

Part (b) of FIG. 4 is a left side view showing a state that a lot of sheets are supported in a sheet bundle while loosening air is blown in the embodiment.

Part (c) of FIG. 4 is a left side view showing a state that a lot of sheets are supported in a sheet bundle when separation air is blown after loosening air stops and a sheet is sucked up by a sucking belt in the embodiment.

Figure 5:
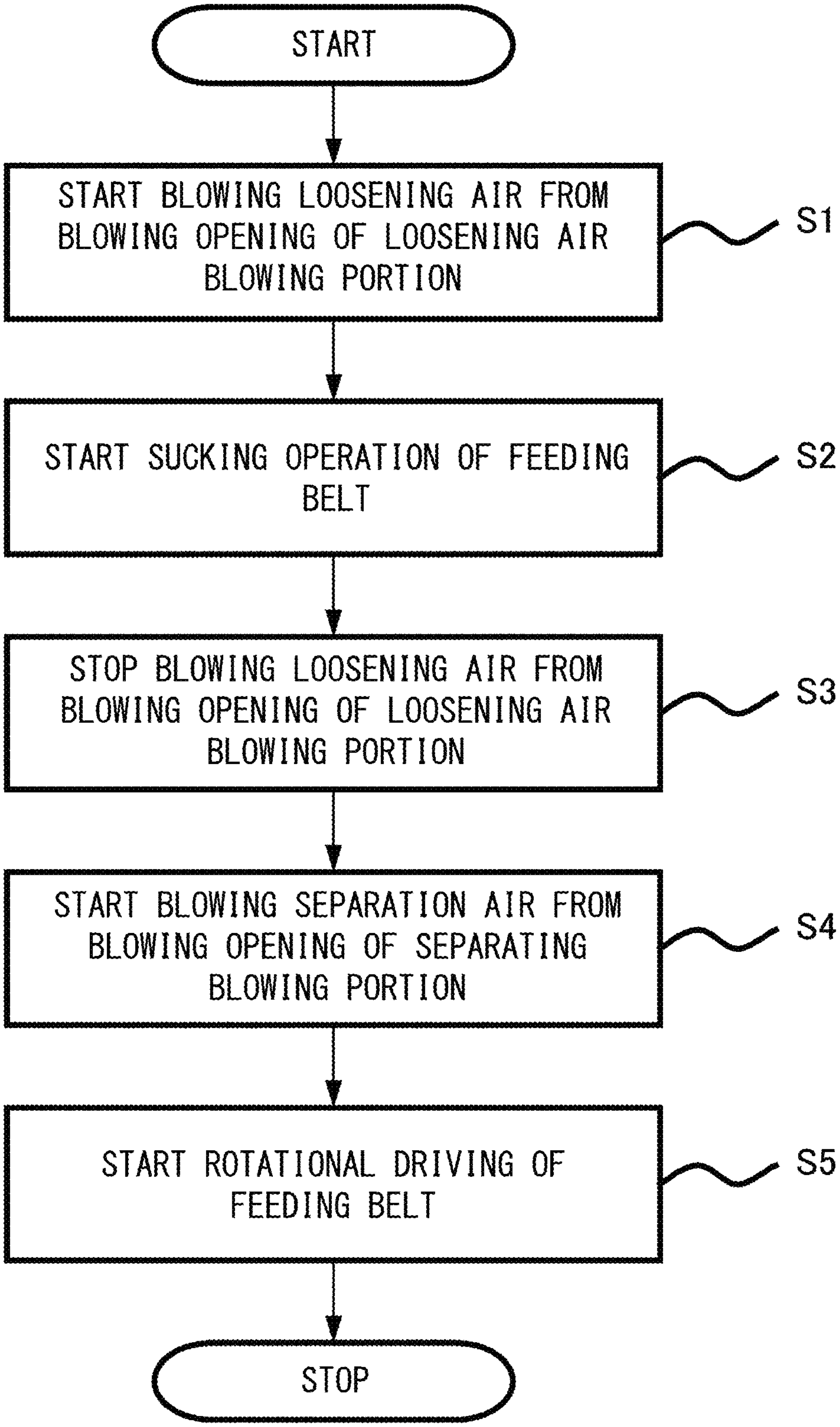

FIG. 5 is a flaw chart showing a process such as blowing loosening air, sucking by the sucking belt, or blowing separation air in the sheet feeding device in the embodiment.

Figure 6:
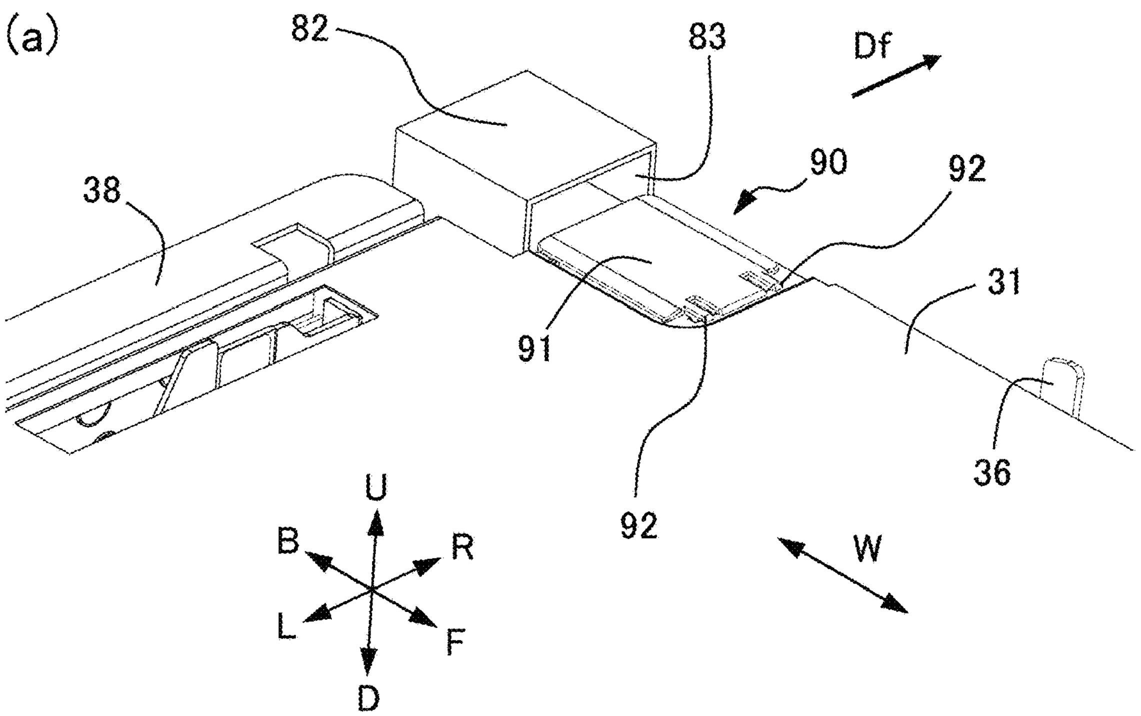
Figure 6:
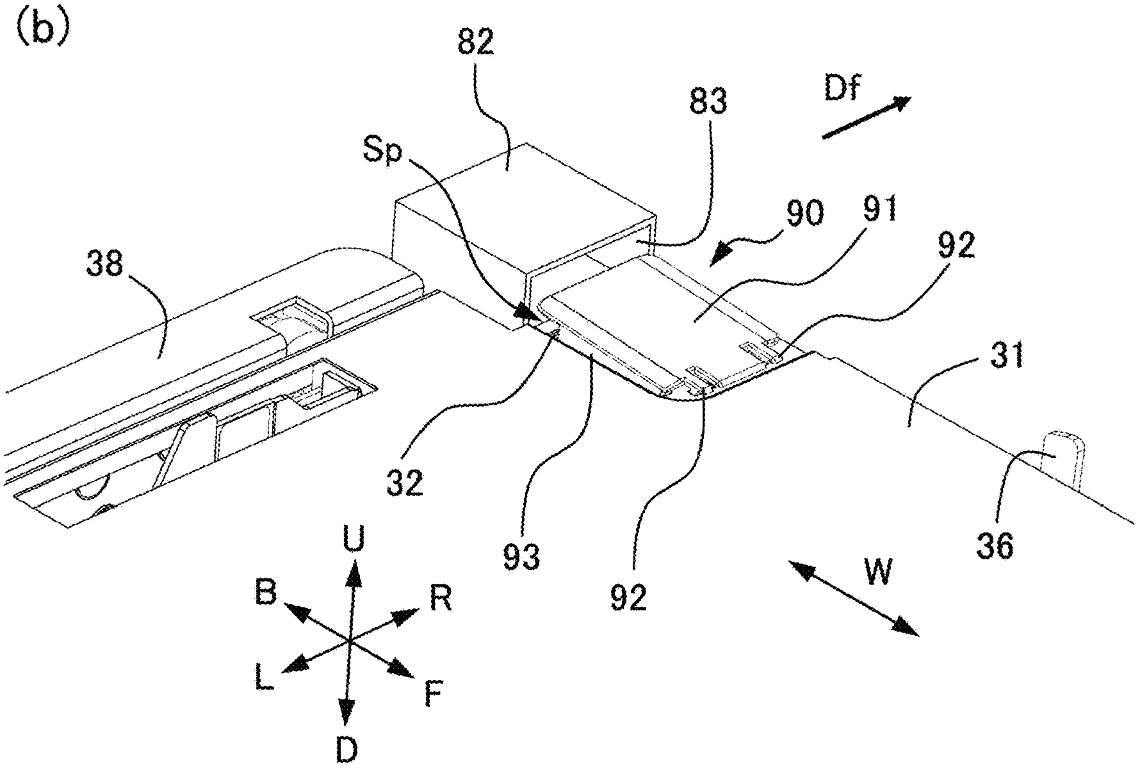

Part (a) of FIG. 6 is a perspective view showing a rotating portion in a state of a closing position in the embodiment.

Part (b) of FIG. 6 is a perspective view showing a rotating portion in a state of an opening position in the embodiment.

Figure 7:
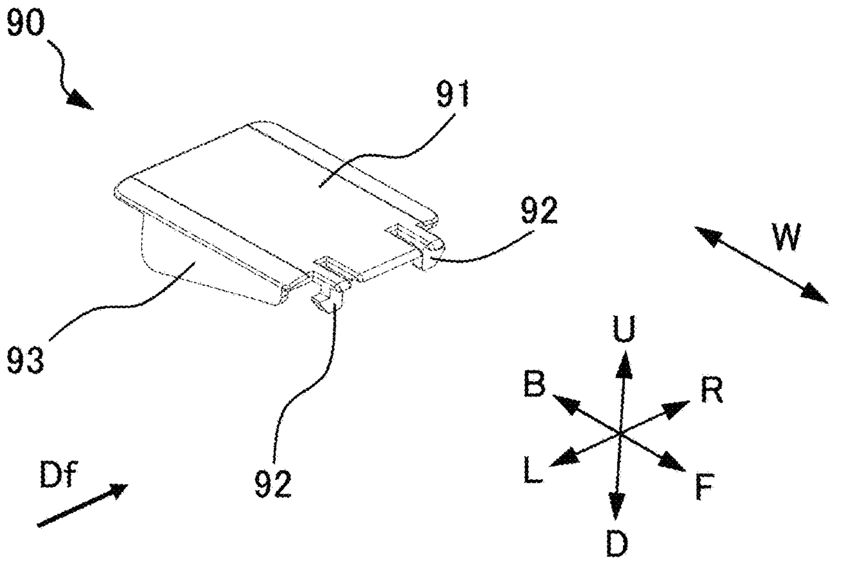
Figure 7:
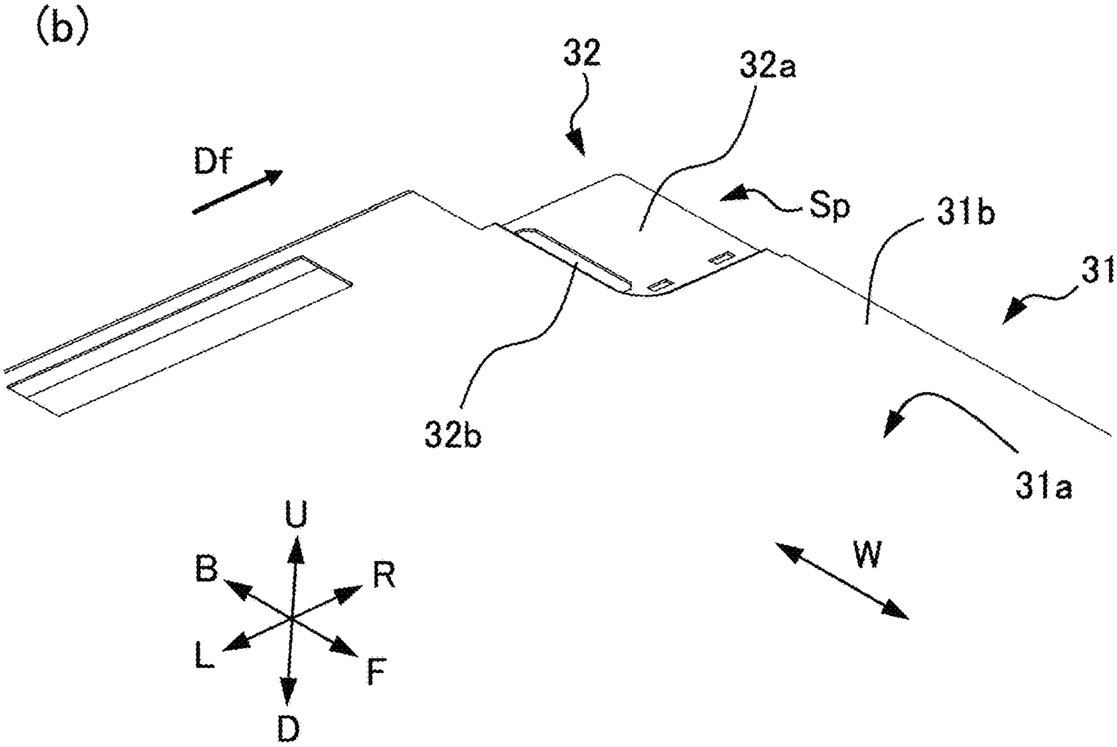

Part (a) of FIG. 7 is a perspective view showing the rotating portion itself in the embodiment.

Part (b) of FIG. 7 is a perspective view of an accommodating portion of a sheet tray which comprises the rotating portion in the embodiment.

Figure 8:
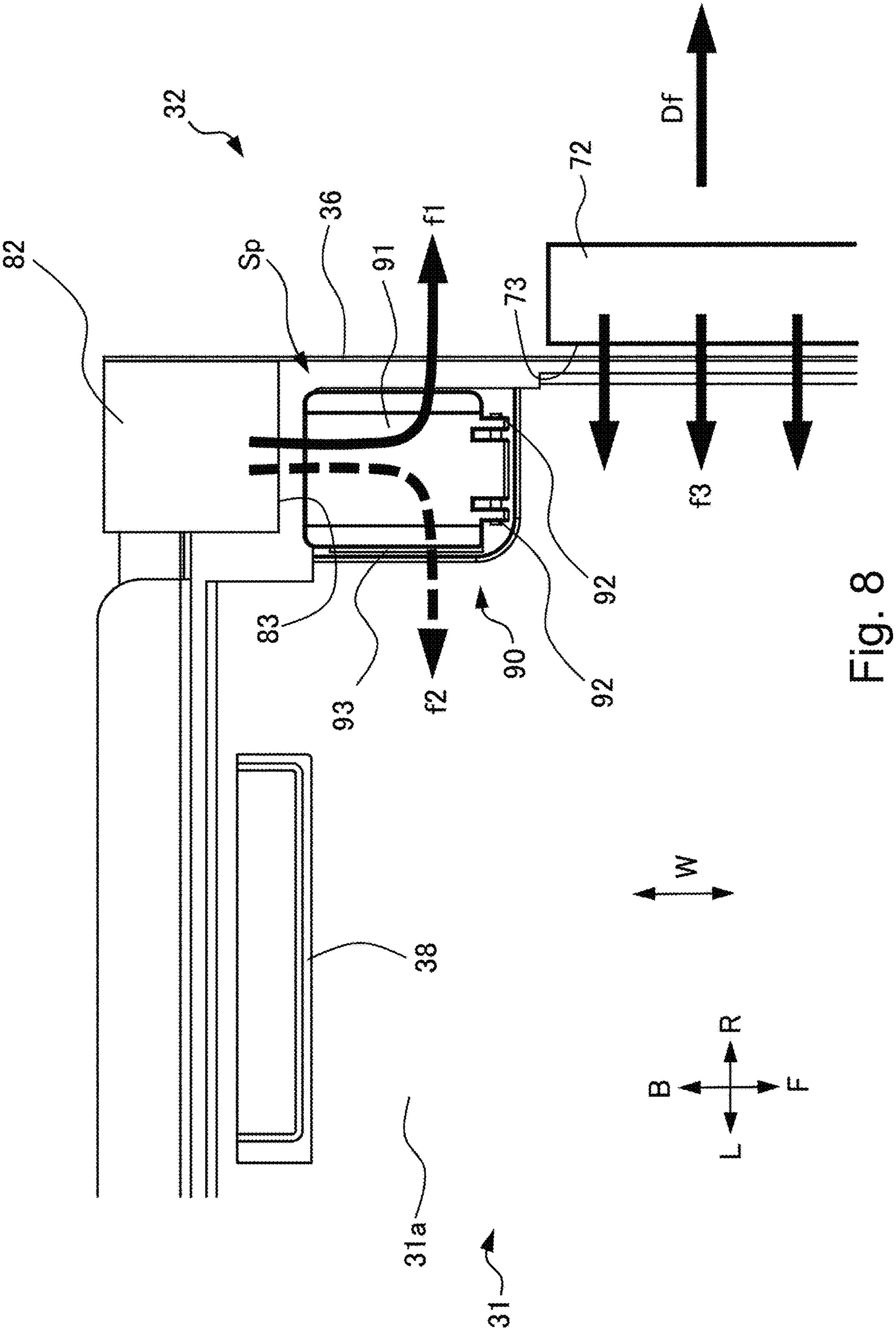

FIG. 8 is a top view showing the rotating portion in the state of opening position in the embodiment.

Figure 9:
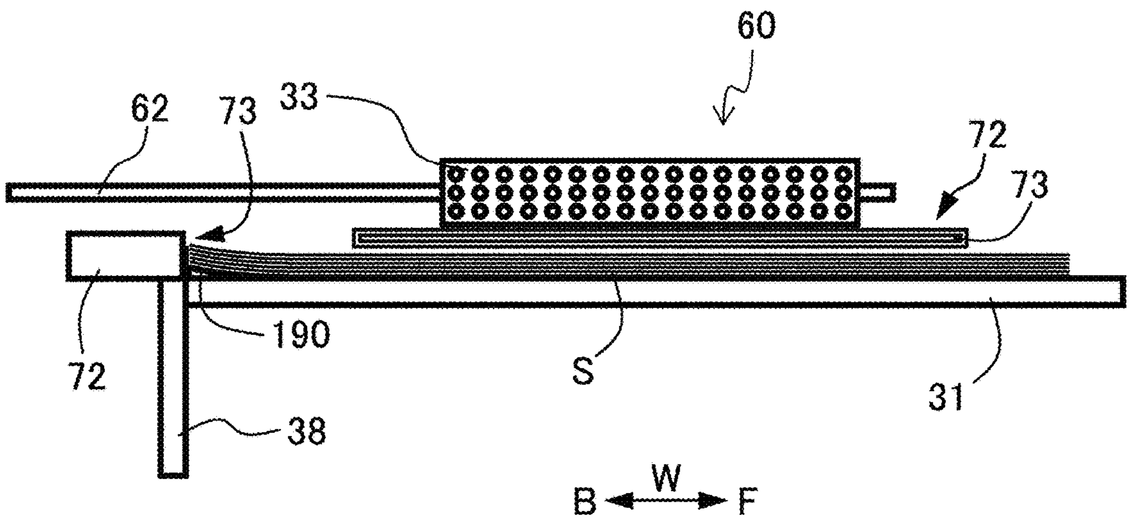
Figure 9:
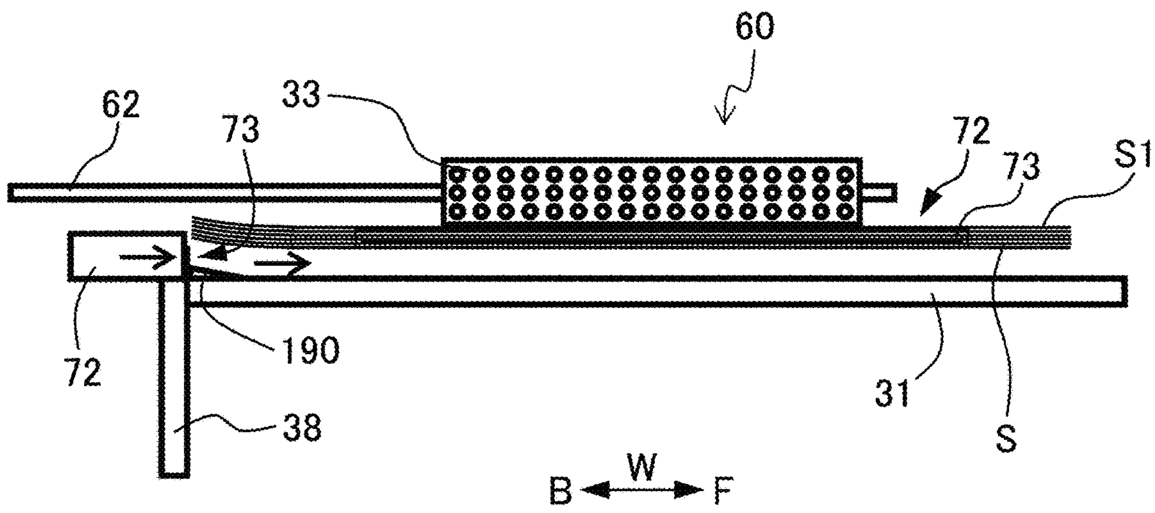

Part (a) of FIG. 9 is a left side view showing a state that few sheets are supported in a sheet bundle before loosening air is blown in a comparing example.

Part (b) of FIG. 9 is a left side view showing a state that few sheets are supported in a sheet bundle while loosening air is blown in the comparing example.

DESCRIPTION OF THE EMBODIMENTS

Figure 1:
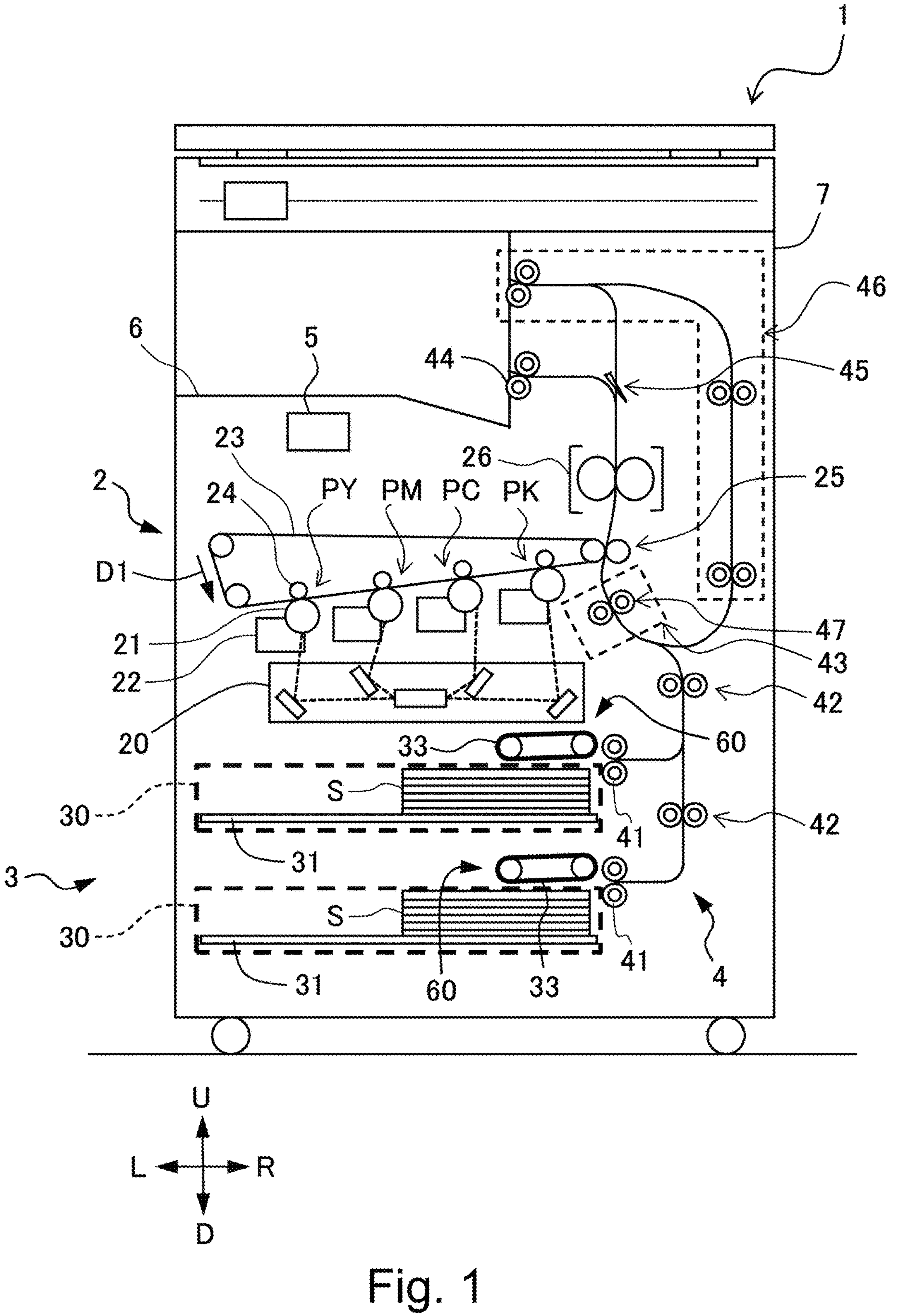
FIG. 1 is a cross-sectional view showing an image forming apparatus in an embodiment.

Hereinafter, a present embodiment will be exemplary described with referring to the drawings as below. First, a schematic structure of an image forming apparatus 1 in the embodiment will be described with referring to FIG. 1. FIG. 1 is a cross-sectional view showing a schematic structure of an image forming apparatus 1 in the present embodiment. The image forming apparatus 1 is a laser beam printer with a tandem and an intermediary transfer type that uses electrophotographic processing. Note that, in the present embodiment, a front side of the image forming apparatus 1 is a face side of FIG. 1 in the sheet of the drawing where a user stands to operate an operation portion and is described as a front direction F. Also, an opposite side of the front side F is described as a back direction B, a left side and a right side when the image forming apparatus 1 is seen from the front side are described as a left direction L and a right direction R, respectively, and, an upper side and a lower side in a gravity direction are described as an upper direction U and a down direction D, respectively.

[Image Forming Apparatus]

The image forming apparatus 1 includes an image forming portion 2 which forms an image on a sheet S, a sheet feeding device 3 which feeds the sheet S to the image forming portion 2, a sheet conveying portion 4 which conveys the sheet S, and a control portion 5 which controls these. The image forming apparatus 1 can form and output an image, which is corresponding to a printing image data output from a host device connected to the control portion 5, with multicolor or monochrome on the sheet S as a recording material.

The image forming portion 2 forms an image on the sheet S fed by the sheet feeding device 3. The image forming portion 2 is a four-drum full-color type that includes a laser scanner 20 and four processing cartridges PY, PM, PC, and PK, [those] which cartridges form a toner image with four colors such as yellow (Y), magenta (M), cyan (C), and black (K). Here, each cartridge PY, PM, PC, and PK includes a photosensitive drum 21, a charging unit, and a developing unit 22 on their own. A toner is provided into the developing unit 22 from a toner cartridge. Also, the image forming portion 2 includes an intermediary transfer belt 23 which rotates in a direction D1, a primary transfer roller 24 arranged to face each photosensitive drum 21 of processing cartridges PY, PM, PC, and PK across the intermediary transfer belt 23, a secondary transfer portion 25, and a fixing portion 26.

The sheet feeding device 3 includes a cassette unit 30 which includes two sheet cassettes arranged vertically in a row. Each cassette unit 30 includes a sheet tray 31 which is able to lift and lower. The topmost sheet of a sheet bundle stacked and supported on the sheet tray 31 is sucked by a feeding belt 33 provided in a main body 7 of the image forming apparatus 1 and then fed out of the cassette unit 30.

A sheet conveying portion 4 includes a pair of pulling rollers 41, a pair of conveying rollers 42, an oblique movement correcting portion 43, a pair of discharging rollers 44, a switching portion 45, and a re-conveying portion 46. The pair of pulling rollers 41 is arranged to face a sheet discharging portion in each cassette unit 30 and is conveys the sheet S received from the cassette unit. The pair of conveying rollers 42 conveys the sheet S conveyed from the pair of pulling rollers 41 to the oblique movement correction portion 43. The oblique movement correction portion 43 includes a pair of registration rollers 47, and corrects an oblique movement of the sheet S by that a front edge of the sheet S abuts the pausing pairs of registration rollers 47. Also, the oblique movement correction portion 43 adjusts a timing at which the sheet S is conveyed to the secondary transfer portion 25 by rotating of the pair of registration rollers 47.

The control portion 5 unitedly controls operation of the image forming apparatus 1, and exchanges information with the host device and the operation portion. Also, the control portion 5 executes other tasks such as processing signals and/or controlling sequence to each sort of processing devices. Here, the host devices are e.g., a personal computer, an image scanner, or a fax. The control portion 5 includes a CPU, a RAM, and a ROM, and controls each portion in the image forming apparatus 1. The CPU outputs an output signal to drive each electric part at a designated timing and with a required amount of controlling power based on detected signals input by each sensor and sensor like, and information stored in the ROM. Therefore, the CPU controls electric parts actually. The ROM and the RAM store required informational data to control each portion, and the CPU loads informational data stored in the ROM and writes it on the RAM.

Figure 2:
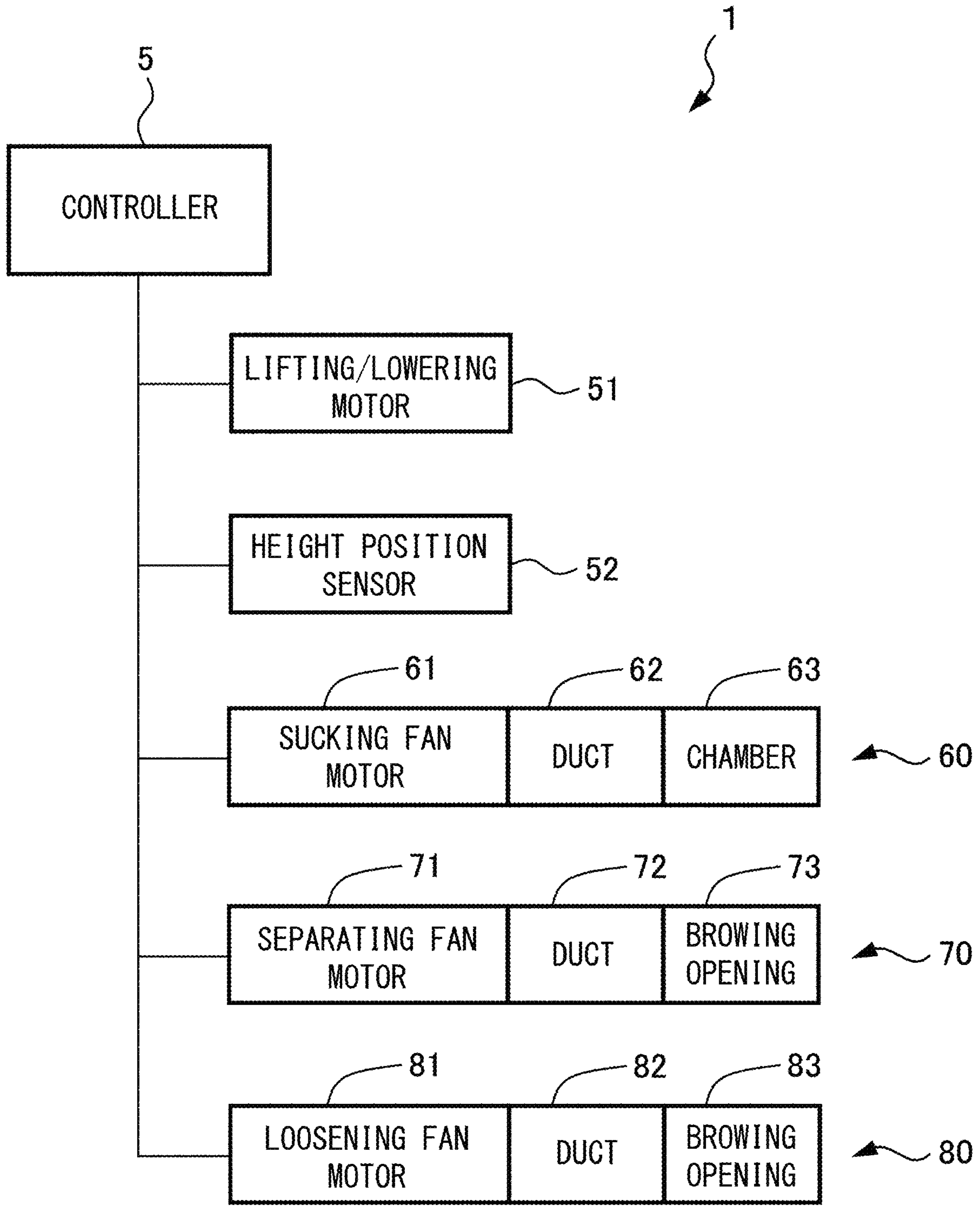
FIG. 2 is a block diagram explaining a control system of a sheet feeding device in the embodiment.

As shown in FIG. 2, the image forming apparatus 1 includes an air feeding portion 60 which sucks the sheet, a separation air blowing portion 70 which blows separation air, and a loosening air blowing portion 80 which blows the loosening air. Each of their structures will be described in detail later. The controlling portion 5 is connected with a sucking fan motor 61 configured to suck in the air feeding portion 60 and, a separation air fan motor 71 configured to blow the separation air in the separation air blowing portion 70, and a loosening air fan motor 81 configured to blow the loosening air in the loosening air blowing portion 80. Also, the control portion 5 is connected with a lifting/lowering motor 51 which is a driving source to lift the sheet tray 31, and a height position sensor 52 configured to detect a height position of the uppermost sheet of the sheet bundle supported by the sheet tray 31. The lifting/lowering motor 51 and a power transmission mechanism between the lifting/lowering motor 51 and the sheet tray 31 are one example of a lifting/lowering portion configured to lift the sheet tray 31.

Next, an image forming movement of the image forming apparatus 1 will be described with FIG. 1. First, when the image forming apparatus receives an image data of an original to be printed, the image information is processed. After that, the image data is exchanged into electric signals and sent to the laser scanner 20 in the image forming portion 2. A surface of the photosensitive drum 21, which is unitedly charged with a predetermined polarity and electric potential by a charger, is sequentially exposed with a laser. Thus, a latent image with each color of yellow, magenta, cyan, and black is sequentially formed on a photosensitive drum 21 of each processing cartridge PY, PM, PC, and PK.

Then, this electrostatic latent image is developed with toner of each color and visualized, and each color part of the toner image on each photosensitive drum 21 is sequentially overlapped to transfer onto the intermediary transfer belt 23 with a primary transfer bias applied on the primary transfer roller 24. Thus, the toner image is formed on the intermediary transfer belt 23.

Also, as same time as this operation of the toner image forming, the sheet S is conveyed one by one from the cassette unit 30 to the pair of registration rollers 47, and the pair of registration rollers 30 corrects oblique movement. After correcting oblique movement, the sheet S is conveyed to the secondary transfer portion 25 by the pair of the registration rollers 47. At the secondary transfer portion 25, the toner image is collectively transferred on the sheet S by a secondary transfer bias.

Next, the sheet S on which the toner image is transferred at the secondary transfer portion 25 is conveyed to the fixing portion 26 and on which each color toner is melted and mixed by being applied with heat and pressure and fixed as the color image at a fixing nip portion formed by a heating roller and a pressure roller. The sheet S on which the image is fixed is discharged to the discharging tray 6 by the pair of discharging rollers arranged on the downstream of the fixing portion 26 and stacked thereon. Note that, in a case that the sheet S is printed on both sides, a route guided to a re-conveying portion 46 is chosen by a switching portion 45 after the image is fixed. The sheet S reverses through the re-conveying portion 46 and is conveyed to the pair of registration rollers 47 again.

[Cassette Unit]

Figure 3:
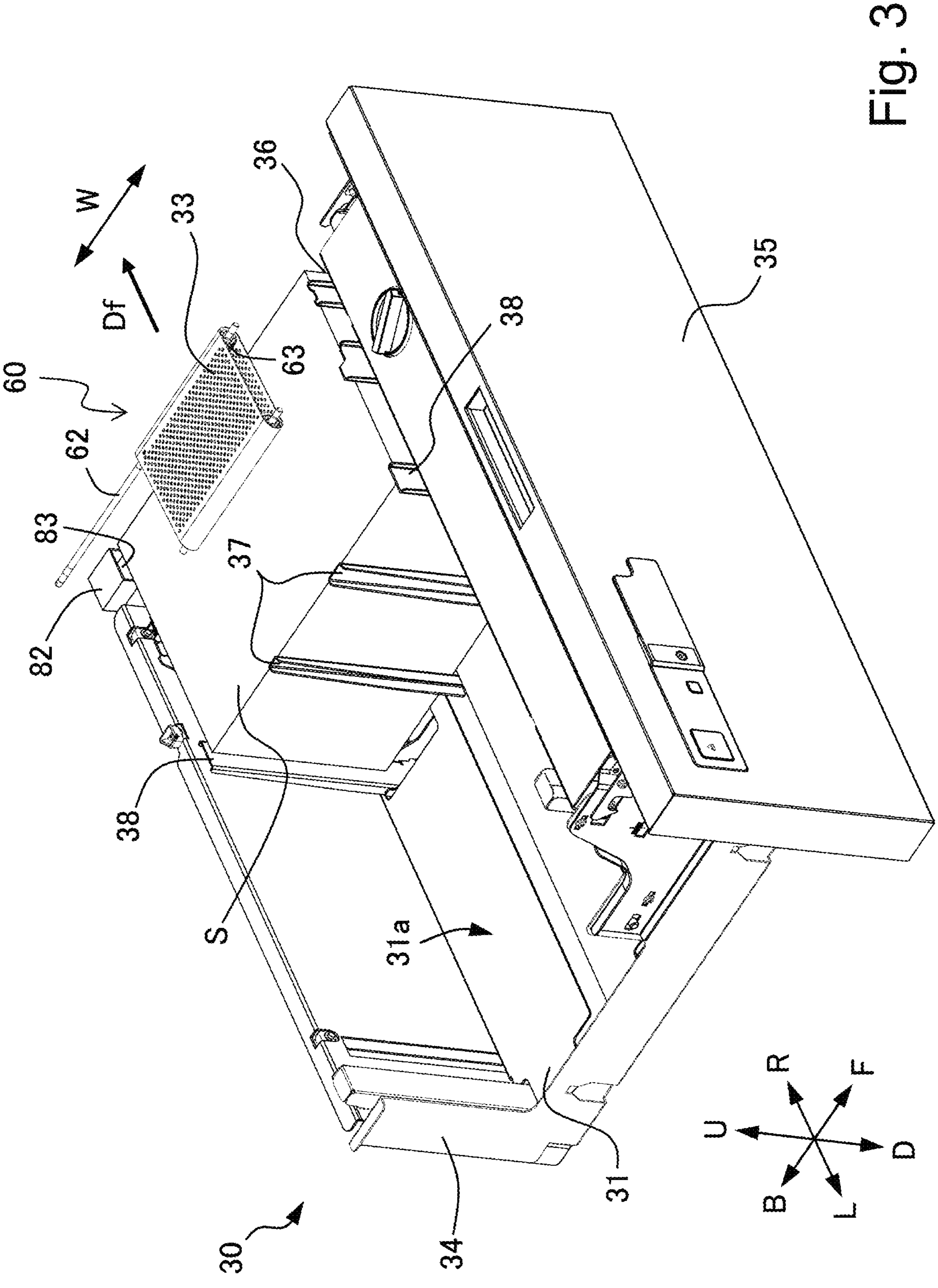
FIG. 3 is a perspective view showing the sheet feeding device in the embodiment.

Next, the cassette unit 30 will be described with FIG. 3. FIG. 3 is a perspective view of the cassette unit 30. Note that, in the present embodiment, while the image forming apparatus 1 includes two of the cassette units 30 (as shown in FIG. 1), one of the cassette units 30 will be described here because the constitution is the same, even when a different size or a different kind of the sheet is used, for example.

The cassette unit 30 includes a fixing frame 34, a front cover 35, and the sheet tray 31. The cassette unit 30 is installed to be detachable in the front direction F side with respect to the main body 7 (shown in FIG. 1) of the image forming apparatus 1. The front cover 35 is fixed to the fixing frame 34 and exposed to the front direction F side of the main body 7 of the image forming apparatus 1 to be able to pull out the whole body of the cassette unit 30 along with the fixing frame 34 when the front cover 35 is pulled out to the front side.

On the right direction R side of the sheet tray 31, a leading edge of a restriction board 36 is provided by being fixed on the fixing frame 34 to restrict and position a downstream end in a sheet feeding direction Df which is a leading edge of the sheet bundle. On the left direction L side of the sheet tray 31, a rear end restriction board 37 is provided by being movable in a left/right direction with respect to the fixing frame 34 to restrict and position in an upstream end of a sheet feeding direction Df which is a rear end of the sheet bundle. On the front direction F side and on the back direction B side, side end restriction boards 38 are provided by being movable in a front/back direction with respect to the fixing frame 34 to restrict and position both ends in a sheet widthwise direction W which are ends of both sides of the sheet bundle. The sheet widthwise direction W is a direction which is perpendicular to the sheet feeding direction Df.

The sheet tray 31 is liftably and lowerably provided to the fixing frame 34 by a driving power of the lifting/lowering motor 51 (shown in FIG. 2), and stacks and holds the sheet S on a sheet supporting surface 31*a* which is a top surface of its own. The sheet tray 31 is lowered and positioned to the lowest position by the lifting/lowering motor 51 when the cassette unit 30 is pulled out of the apparatus main body 7. The sheet tray 31 is lifted by the lifting/lowering motor 51 based on the position of the uppermost sheet of the sheet bundle supported by the sheet tray 31. Specifically, the height position sensor 52 is configured to detect whether the uppermost sheet S is in the predetermined height where it can be sucked underneath the feeding belt 33. The control portion 5 drives the lifting/lowering motor 51 to lift the sheet tray 31 so as the uppermost sheet to be placed in the predetermined height corresponding to the result detected by the height position sensor 52.

The air feeding portion 60, the feeding belt 33, the separation air blowing portion 70, and the loosening air blowing portion 80 are provided around the cassette unit 30 (shown in FIG. 2). The uppermost sheet of the sheet bundle stacked and supported on the sheet tray 31 is loosened by the loosening air from the loosening air blowing portion 80 and is sucked by the feeding belt 33. The sheet S that is sucked is separated one by one by the separation air from the separation air blowing portion 70 and fed.

The air feeding portion 60 and the feeding belt 33 are examples of a feeding portion and a sucking/feeding portion configured to suck and feed the uppermost sheet of the sheet bundle supported by the sheet supporting surface 31*a*. The air feeding portion 60 includes a sucking fan motor 61 which sucks air (shown in FIG. 2), a duct 62 connected with the sucking fan motor 61, and a chamber 63 which is connected with the edge of the duct 62 and includes suction ports around it. The chamber 63 is arranged in an inner peripheral side of the feeding belt 33. The feeding belt 33 is arranged above an edge portion of the right direction R side of the sheet supporting surface 31*a*. The chamber 63 includes a lot of holes on its surface and is arranged to surround the chamber 63. The sheet S can be conveyed to the downstream side by rotating the feeding belt 33 in a state that the sheet S is sucked.

The separation air blowing portion 70 includes a separating fan motor 71 which blows air out (shown in FIG. 2), a duct 72 connected with the separating fan motor 71, and a blowing opening73 which opens in the duct 72 (shown in Part (a) of FIG. 4). The duct 72 is arranged between the uppermost sheet and the feeding belt 33, is shaped thin in the vertical direction, and is opening to the upstream side of the sheet feeding direction Df so as to form the blowing opening 73. The separation air blowing portion 70 is an example of a separating portion and a secondary blowing portion, and is configured to blow air (separation air) from the downstream side to the upstream side of the sheet feeding direction Df onto the sheet S to separate the plural number of sheets S sucked to the air feeding portion 60 one by one.

The loosening air blowing portion 80 includes, a loosening fan motor 81 which blows air out (shown in FIG. 2), a duct 82 connected with the loosening fan motor 81, and a blowing opening 83 which opens to the duct 82. The loosening air blowing portion 80 is an example of a blowing portion and/or primary blowing portion, and is configured to blow air (loosening air) onto the upper part of the sheet bundle supported by the sheet supporting surface 31*a* through the blowing opening 83 from a side (the back direction B side) of the sheet widthwise direction W to loosen the sheet of the sheet bundles. In the present embodiment, the blowing opening 83 is arranged to face the downstream end portion of the sheet feeding direction Df in the supporting area which supports a maximum size of the sheet when it is seen in the perpendicular direction of the sheet feeding direction Df and the sheet feeding direction W. Thus, separating becomes easier by blowing the loosening air onto the leading end portion of the sheet bundle to loosen. Here, the relative position between the duct 82 and the side end restriction board 38 is determined in the front and back direction. In the other words, the duct 82 is installed to the side end restriction board 38 or the side end restriction board 38 is connected to the duct 82. By doing this, the distance from the side end portion to the duct 82 can be kept constant at all times even when the width size of the sheet S is changed.

[Sheet Feeding Operation]

Next, an operation of feeding the sheet S will be described with, Part (a), (b), and (c) of FIG. 4, and a flowchart in FIG. 5. As shown in Part (a) of FIG. 4, the control portion 5 drives the lifting/lowering motor 51 to move to the proper height for feeding the sheet based on the result detected by the height position sensor 52 when the sheet bundle is stacked on the sheet tray 31. As shown in Part (b) of FIG. 4, the control portion 5 drives the loosening air blowing portion 80 to blow the loosening air from the blowing opening 83 of the duct 82, and air is blown to the side end portion of the upper part of the sheet bundle (S1 in FIG. 5). Therefore, about five to ten sheets S in the upper part of the sheet bundle are blown and risen.

At the same time, the control portion 5 drives the air feeding portion 60 to start a movement of sucking the uppermost sheet by the feeding belt 33 (S2 in FIG. 5). Also, as shown in Part (c) of FIG. 4, the control portion 5 stops the loosening air blowing portion 80 so as to stop blowing the loosening air from the duct 82 (S3 in FIG. 5).

Further, at the same time, the control portion 5 drives the separation air blowing portion 70 to blow separation air from the blowing opening 73 of the duct 72, and air is blown to the rising sheets S (S4 in FIG. 5). Thus, the uppermost sheet is risen even more to the direction of the feeding belt 33 and the uppermost sheet S1 is sucked onto the feeding belt 33. At this point, the separation air is blown in between the uppermost sheet sucked by the feeding belt 33 and the following sheet right underneath to separate the uppermost sheet from the following sheets.

Later, the control portion 5 stops the blowing operation of the separation air blowing portion 70, and all the sheets risen are fallen down to the sheet tray 31. At this timing, the control portion 5 feeds the uppermost sheet S only by driving to rotate the feeding belt 33 (S5 in FIG. 5). By repeating this operation described above, it is possible to feed the sheet one by one.

[Rotating Portion]

Here, when most sheets of the sheet bundle stacked on the sheet tray 31 are fed and only less than 10 sheets are left, there is a risk that the loosening air misses to loosen the sheet because the loosening air passes above the sheet bundle so as to deteriorate loosening performance. Thereat, as shown in Part (a) of FIG. 9, in a spot facing the blowing opening 83 of the loosening air blowing portion 80 in the sheet tray 31, it is invented to provide a rotating portion 190 which can open and close by rotating, and which forms a space in between the sheet tray 31 when it is in an opening position which is its secondary position. This rotating portion 190 is in a closing position which is its primary position while a lot of sheets are stacked on the sheet tray 31, and it rises and rotates to the opening position by the loosening air blown onto when the number of the sheets is about less than 10 in order to raise the edge portion of the sheet. Thus, the loosening air is certainly able to blow the end portion of the sheet bundle. Therefore, it becomes possible to avoid deteriorating loosening performance by loosening the sheet bundle by loosening air because the loosening air hardly passes above the sheet bundle even when the number of the sheet in the sheet bundle stacked on the sheet tray 31 is about less than 10.

However, depending on the situation such as the weight of the sheet or environment in high temperature and high humidity, there is still a risk that the problem described below happens even when the rotating portion 190 is provided. In this case, as shown in the comparing example in Part (a) of FIG. 9, the rotation rotating portion 190 blown by the loosening air, which is blown to the side end of the sheet bundle, can be driven upward. But, after this process, there is a risk that air comes in between the undermost sheet and the sheet tray 31 and rises the whole bundle of less than about 10 sheets, as shown in Part (b) of FIG. 9. Originally, the separation air is blown between the uppermost sheet and the following sheet right underneath to surely separate the uppermost sheet from the sheet bundle by blowing from the leading edge of the sheet; however, the air cannot come in between the uppermost sheet and the following sheet right underneath in the comparing example in Part (b) of FIG. 9. Thus, a risk of duplicate feeding may be increased when malfunction of separating sheet occurs and keeps being stuck each other sheet surface. To solve this, a partition portion 93 which is a restriction portion is provided below the rotating portion 90 to keep the loosening air out between the undermost sheet and the sheet tray 31 in the present embodiment.

Hereinafter, the rotating portion 90 in the present embodiment will be described with Part (a) and (b) of FIG. 6, Part (a) and (b) of FIG. 7, and FIG. 8. As shown in Part (a) and (b) of FIG. 6, the rotating portion 90 is provided in a state of being free to rotate with respect to the sheet tray 31 with regarding the sheet feeding direction Df as a rotational axis, and is arranged on a side (the back direction B side) of the sheet widthwise direction W in the supporting area of the sheet S in the sheet tray 31. In other words, the rotating portion 90 is arranged in the side end portion of the downstream of the sheet feeding direction in the supporting area where the largest size of the sheet S is supported as seen in the direction which is perpendicular to the sheet feeding direction Df and the sheet widthwise direction W.

The rotating portion 90 is possible to change its position by rotating between a closing position which is placed on or below a same plane with respect to the sheet supporting surface 31*a*, and an opening position which opens the back direction B side in the sheet widthwise direction W upward from the sheet supporting surface 31*a*, and forms a space Sp in between the sheet tray 31. Part (a) of FIG. 6 shows when the rotating portion 90 is in the closing position, and Part (b) of FIG. 6 shows when the rotating portion 90 is in the opening position.

As shown in Part (a) of FIG. 7, the rotating portion 90 includes a supporting board 91 which is able to support the sheet on its top surface, hinges 92 which construct a rotational axis in two spots, and a partition portion 93. The partition portion 93 is provided protruding downward from the back side of the supporting board 91, is a flange shape regarding the left/right direction as its thickness, and partitions the sheet supporting surface 31*a* and the space Sp when the rotating portion 90 is in the opening position. The partition portion 93 is formed at the side end of the upstream of the sheet feeding direction Df in the rotating portion 90. Thus, the whole of the space Sp below the rotating portion 90 is partitioned from the sheet supporting surface 31*a* by the partition portion 93. Also, the partition portion 93 is arranged in the upper stream than the blowing opening 83 as seen in the direction which is perpendicular to the sheet feeding direction Df and sheet widthwise direction W. Then, the space Sp is formed in the downstream of the sheet feeding direction Df from the partition portion 93. Note that, it is not limited to the case that the partition portion 93 is formed in the side end portion of the upstream in the sheet feeding direction Df in the rotating portion 90 in the present embodiment as described above. For example, the partition portion 93 may be provided in the slightly downstream side from the side end portion of the upstream in the sheet feeding direction Df in the rotating portion 90. In this case, the space is formed in between the partition portion 93 and the sheet supporting surface 31*a* in the upper stream of the sheet feeding direction Df than where the partition portion 93 is and a very small amount of the loosening air is blown into between the undermost sheet and the sheet supporting surface 31*a*.

As shown in Part (b) in FIG. 7, the sheet tray 31 is formed with the sheet supporting surface 31*a* on its top surface, and includes a top board portion 31*b* which is almost board shape and forms the top portion of the sheet tray 31. The top board portion 31*b* includes an accommodating portion 32 with shaping recessed from the sheet supporting surface 31*a* so as to accommodate the rotating portion 90 positioned in the closing position. The accommodating portion 32 is provided next to the duct 82 arranged in the side end restricting board 38. The accommodating portion 32 includes a bottom portion 32*a* and a hole portion 32*b* formed in the bottom portion 32*a*. The hole portion 32*b* is provided to accommodate the whole body of the accommodating portion 32 by causing the partition portion 93 to penetrate downward and hide from the top board portion 31*b* in the case that the rotating portion 90 is in the closing position and accommodated in the accommodating portion 32. The top surface of the rotating portion 90 is positioned in the same level with the sheet supporting surface 31*a* by [that] the supporting board 91 being accommodated in the accommodating portion 32. Note that, while they are positioned on the same level in the present embodiment, it is not limited to thereto and the level of the supporting board 91 can be lower than the level of the sheet supporting surface 31*a*. To be lower than the sheet supporting surface 31*a* is preferred because a gap is not formed between the undermost sheet of the sheet bundle supported by the sheet tray 31 and the sheet supporting surface 31*a*.

In the present embodiment, the accommodating portion 32 is shaped as the top surface of the bottom portion 32*a* opens to the back direction B side of the sheet widthwise direction W in the surface direction of the top surface (the directions included within the surface), and also opens to the downstream of the sheet feeding direction Df. In other words, the accommodating portion 32 is not a concaved portion that is closed in all ways to the horizontal direction, but opens to the back direction B side and to the right direction R side, and is able to allow the loosening air to blown from the back direction B side flow and turn through the space Sp and flow outward the right direction R side.

Next, the rotating mechanism of the rotating portion 90 will be described. Because the rotating portion 90 has risen to the position where it faces the duct 82 when the number of the sheet left is about less than 10, the air blown from the duct 82 is blown between the rotating portion 90 and the accommodating portion 32 in the tray so as to be able to move the rotating portion 90 upward. By the rotating portion 90 rising, the air is properly blown to the side end of the sheet bundle to be able to lift the sheet and improve the separation performance for each sheet even when the number of the sheet left is about less than 10.

Here, about the rotating portion 90, its bottom end portion in the back direction B side of the supporting board 91 is chamfered in the present embodiment. Therefore, an inflow shape that the loosening air blown from the blowing opening 83 is lead to flow into a gap between the bottom surface of the rotating portion 90 and the accommodating portion 32 is implemented, and this makes the rotating portion 90 be able to be in the opening position by the loosening air. Note that, whether the rotation portion rotates or not depends on a relation between the weight of the rotation portion itself, the weight of the sheets stacked, and the amount of air. In the present embodiment, while the case is described that the bottom end portion in the back direction B side of the supporting board 91 is chamfered to be the inflow shape which lets the loosening air flow into, it is not limited thereto but the bottom end in the back direction B side of the bottom portion 32*a* of the accommodating portion 32 of the sheet tray 31 may be chamfered. Or, it is not limited to the chamfered shape, but may be any gap structure such as a ditch.

In the present embodiment, at least one part of the rotating portion 90 moves to the opening position when it opposes to the right front of the blowing opening 83 and receives the loosening air. In other words, as seen in the sheet widthwise direction W, the rotating portion 90 is positioned in the opening position when at least a part of the rotating portion 90 covers the blowing opening 83, and is positioned in the closing position when the rotating portion 90 does not cover the blowing opening 83.

As shown in FIG. 8, the air used to move the rotating portion 90 upward flows in a direction of an arrow f1 by a wall which is formed by the partition portion 93 of the rotating portion 90 and a journaling part which the hinge 92 is supported pivotally on the accommodating portion 32 of the sheet tray 31. Thus, the air hardly flows in a direction of an arrow f2 which is the downstream of the sheet feeding direction Df of the sheet bundle. In other words, since the loosening air which blown onto the side end portion of the sheet bundle is hard to flow in between the undermost sheet and the sheet tray 31, it is prevented from lifting whole of the sheet bundle with about less than 10 sheet only. Therefore, the separation air blown from the duct 72 in the separation air blowing portion 70 in a direction of an arrow f3 is blown in between the upmost sheet and the following sheet right underneath, the ability to separation is improved, and duplicate feeding can be prevented.

As described above, according to the sheet feeding device 3 in the present embodiment, the rotating portion 90 includes the partition portion 93 which partitions between the sheet supporting surface 31*a* and the space Sp under the rotating portion 90 when the rotation portion is in the opening position. Thus, the loosening air blown onto the sheet bundle which has less sheets hardly flows from the space Sp to the direction of the sheet supporting surface 31*a* when the rotating portion 90 is in the opening position. Therefore, the sheet bundle can be prevented from lifting and the separation ability for the sheet bundle can be improved because the air hardly flows in between the undermost sheet of the sheet bundle and the sheet supporting surface 31*a*.

Also, a cost can be suppressed in the present embodiment because the loosening air can be reduced to flow in between the undermost sheet of the sheet bundle and sheet supporting surface 31*a* by only providing with an easy structure like the partition portion 93 in the rotating portion 90.

Note that, in the embodiment described above, while the structure that the rotating portion 90 moves to the opening position by blowing the loosening air, it is not limited thereto. In other words, an urging portion which gives the rotating portion 90 urging power to rotate the rotating portion 90 from the closing position to the opening position may be provided. This urging portion urges the rotating portion 90 to rotate from the closing position to the opening position when the urging power is greater than the weight of the rotating portion 90 itself and the weight of the sheet bundle supported by the upper part of the rotating portion 90. As the urging portion, for example, a structure that a cam which rotates corresponding to the height of the sheet tray 31 is provided and the rotating portion 90 rotates by corresponding to the height of the sheet tray 31 as linking to this cam may be applied. Or, a structure that a spring which urges the rotating portion 90 to rotate to the opening position and the rotation portion rotate to the opening position when the urging power of the spring is greater than the weight of the left sheets, may be applied.

Also, in the embodiment described above, while it is described that the feeding portion is comprised of the air feeding portion 60 and the feeding belt 33, and the separating portion is comprised of the separation air blowing portion 70, it is not limited thereto. For example, it may be possible that the feeding roller is the feeding portion, and the separating roller is the separating portion.

Further, in the embodiment described above, while the sheet feeding device is applied for the cassette unit in the image forming apparatus 1, it is not limited thereto, but a manual installing tray may be applied, for example. Furthermore, it is not limited to be provided within the image forming apparatus 1, but a single body of the sheet feeding device with large capacity may be applied.

Further, in the embodiment described above, while the sheet feeding device is applied for the cassette unit in the image forming apparatus 1, it is not limited thereto, but manual installing tray may be applied, for example. Furthermore, it is not limited to be provided within the image forming apparatus 1, but a single body of the sheet feeding device with large capacity may be applied.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-067736 filed on Apr. 18, 2024, which is hereby incorporated by reference herein in its entirety.

What is claimed is:

1. A sheet feeding device comprising:

a sheet tray including a first sheet supporting surface configured to support a sheet bundle;

a feeding portion configured to feed an uppermost sheet of the sheet bundle supported by the first sheet supporting surface;

a blowing portion configured to blow air through a blowing opening toward a side edge of the sheet bundle supported by the first sheet supporting surface; and a rotatable portion provided in a position opposing the blowing opening in a sheet widthwise direction perpendicular to a sheet feeding direction and including a second sheet supporting surface configured to support the sheet bundle, the rotatable portion being rotatable between a first position along the first sheet supporting surface and a second position rotated upward from the first position by the air being blown by the blowing portion, wherein when the rotatable portion is positioned in the second position, the rotatable portion includes a restricting portion configured to restrict a part of the air being blown by the blowing portion from blowing toward upstream of the sheet feeding direction.

2. The sheet feeding device according to claim 1, wherein the sheet tray is capable of lifting and lowering, wherein the sheet feeding device further comprises a lifting/lowering portion configured to lift and lower the sheet tray, and wherein the lifting/lowering portion is configured to lift the sheet tray based on a position of the uppermost sheet of the sheet bundle supported by the first sheet supporting surface of the sheet tray.

3. The sheet feeding device according to claim 1, further comprising an urging portion configured to apply an urging force, which urges the rotatable portion so as to rotate from the first position to the second position, to the rotatable portion, wherein the urging portion rotates the rotatable portion from the first position to the second position by urging in a case in which the urging force is larger than a weight of the rotatable portion and the sheet bundle supported by the rotatable portion.

4. The sheet feeding device according to claim 1, wherein as viewed in the sheet widthwise direction, the rotatable portion is positioned in the second position in a case in which at least a part thereof is overlapped with the blowing opening, and is positioned in the first position in a case in which the rotatable portion is not overlapped with the blowing opening.

5. The sheet feeding device according to claim 1, wherein as viewed in a direction perpendicular to the sheet feeding direction and the sheet widthwise direction, the blowing opening is disposed opposite to a downstream side end in the sheet feeding direction in a supporting area where a sheet with a maximum size, which can be placed on the sheet tray, is supported.

6. The sheet feeding device according to claim 1, wherein as viewed in a direction perpendicular to the sheet feeding direction and the sheet widthwise direction, the rotatable portion is disposed opposite to a downstream side end in the sheet feeding direction in a supporting area where a sheet with a maximum size, which can be placed on the sheet tray, is supported.

7. The sheet feeding device according to claim 1, wherein the restricting portion is formed in an upstream end side in the sheet feeding direction in the rotatable portion, and wherein the air is sent to downstream from the restricting portion.

8. The sheet feeding device according to claim 1, wherein as viewed in a direction perpendicular to the sheet feeding direction and the sheet widthwise direction, the restricting portion is disposed upstream of the blowing opening in the sheet feeding direction.

9. The sheet feeding device according to claim 1, wherein the sheet tray includes an upper plate portion on which an accommodating portion, with a shape recessed from the first sheet supporting surface, is formed so as to accommodate the rotatable portion positioned in the first position, and wherein the accommodating portion includes a bottom portion and a through hole which is formed in the bottom portion and through which the restricting portion is penetrated below the upper plate portion.

10. The sheet feeding device according to claim 9, wherein in the accommodating portion, an upper surface of the bottom portion opens on the one side in the sheet widthwise direction and opens downstream in the sheet feeding direction.

11. The sheet feeding device according to claim 1, wherein the blowing portion is a first blowing portion, wherein the feeding portion is a suction feeding portion which sucks and feeds the uppermost sheet of the sheet bundle, and wherein the sheet feeding device further comprises a second blowing portion which separates the sheet sucked by the suction feeding portion one by one by blowing the air to the sheet sucked by the suction feeding portion from downstream of the sheet feeding direction to upstream.

12. An image forming apparatus comprising:

a sheet feeding device according to claim 1; and an image forming portion configured to form an image on a sheet fed by the sheet feeding device.

13. An image forming apparatus according to claim 12, wherein the sheet feeding device includes a sheet cassette accommodated in a main assembly of the image forming apparatus and configured to feed the sheet to the image forming portion.

14. The sheet feeding device according to claim 1, wherein the restricting portion is provided to project from an opposite surface of the second sheet supporting surface along the sheet width direction.

* * * * *